(12) United States Patent
Takahashi et al.

(10) Patent No.: US 8,419,951 B2
(45) Date of Patent: Apr. 16, 2013

(54) METHOD OF MANUFACTURING MAGNETIC RECORDING MEDIUM, AND MAGNETIC RECORDING/REPRODUCING DEVICE

(75) Inventors: Yoshiko Takahashi, Ichihara (JP); Yuki Hirai, Ichihara (JP); Tomoo Shige, Chiba (JP)

(73) Assignee: Showa Denko K.K., Tokyo (JP)

( * ) Notice: Subject to any disclaimer, the term of this patent is extended or adjusted under 35 U.S.C. 154(b) by 178 days.

(21) Appl. No.: 13/093,417

(22) Filed: Apr. 25, 2011

(65) Prior Publication Data

US 2011/0261479 A1  Oct. 27, 2011

(30) Foreign Application Priority Data

Apr. 27, 2010  (JP) ................................. 2010-102155

(51) Int. Cl.
  *B44C 1/22* (2006.01)
(52) U.S. Cl.
  USPC .......................................................... 216/22
(58) Field of Classification Search ..................... 216/22
  See application file for complete search history.

(56) References Cited

FOREIGN PATENT DOCUMENTS

| JP | 06-259709 A | 9/1994 |
|---|---|---|
| JP | 09-097419 A | 4/1997 |
| JP | 2005-100496 A | 4/2005 |
| JP | 2009245554 A | * 10/2009 |

* cited by examiner

*Primary Examiner* — Roberts Culbert
(74) *Attorney, Agent, or Firm* — Sughrue Mion, PLLC

(57) ABSTRACT

A method of manufacturing a magnetic recording medium is provided, which include: forming a magnetic layer on the surface of a nonmagnetic substrate; forming a groove in which a nonmagnetic section is formed by etching a portion corresponding to a formation region of the nonmagnetic section in the magnetic layer and a magnetic recording section formed of the magnetic layer; applying a resin having an active energy ray curable functional group to the surface of the magnetic recording section so as to fill the groove; pressing a plate material against the resin so that the smooth surface of the plate material is in contact with the surface of the resin to make the surface of the resin smooth; removing the plate material from the resin; and forming the nonmagnetic section in the groove by etching and removing a portion located above the surface of the magnetic recording section in the resin having a smooth surface.

9 Claims, 7 Drawing Sheets

METHOD OF MANUFACTURING MAGNETIC RECORDING MEDIUM, AND MAGNETIC RECORDING/REPRODUCING DEVICE

CROSS-REFERENCE TO RELATED APPLICATIONS

Priority is claimed on Japanese Patent Application No. 2010-102155, filed Apr. 27, 2010, the content of which is incorporated herein by reference.

FIELD OF THE INVENTION

The present invention relates to a method of manufacturing a magnetic recording medium, and a magnetic recording/reproducing device.

BACKGROUND OF THE INVENTION

In recent years, the applications of magnetic recording devices such as magnetic disk drives, floppy (registered trademark) disk drives, and magnetic tape drives have remarkably increased, and the importance of the magnetic recording devices has increased.

In particular, high densification of the surface recording density has increased considerably with the introduction of the MR head (MagnetoResistive head), PRML (Partial Response Maximum Likelihood) technology, the GMR head (Giant MagnetoResistive head), the TMR head (Tunnel MagnetoResistive head), and the like.

Thereby, there has been a demand for an even higher recording density to be achieved in the magnetic recording medium applied to the above-mentioned magnetic recording device. For this reason, there has been a need for a magnetic recording medium having a higher coercive force and a high S/N ratio (ratio obtained by dividing the signal amount by the noise amount).

Moreover, in the magnetic recording medium of recent years, the film thickness of the medium has been reduced in order to achieve the high surface recording density. For this reason, there is a phenomenon that the recorded magnetization is weakened due to thermal disturbance. Particularly, there is a great technical problem for the thermal stability of magnetic recording.

Among other things, when the S/N ratio increases, thermal stability of the recorded magnetization often decreases. This is because generally the medium having a high S/N ratio often has a minute crystal grain size of magnetic grains included in a magnetic recording layer, which is effective for the medium noise, but on the other hand, becomes close to an unstable region in terms of thermal stability of magnetism.

Moreover, in recent years, efforts have been maintained to raise the surface recording density with an increase in the track density, and in the magnetic recording device, the track density has reached 350 kTPI.

However, when the track density is raised, magnetic recording information between the adjacent tracks interferes with each other. Therefore, a problem easily occurs in which a magnetization transition region located at the boundary region thereof becomes a noise source and thus the S/N ratio decreases.

Occurrence of such a problem leads to a decrease in the bit error rate, which becomes an obstacle to the improvement of the recording density.

In addition, as the distance between the tracks comes closer, an extremely high-accuracy track servo technique is required for the magnetic recording device.

Moreover, in the magnetic recording device, a method is generally used in which the recording is executed widely and the reproduction narrower than at the time of recording in order to eliminate the influence from the adjacent track as much as possible is executed. In this method, the influence between the tracks can be suppressed to the minimum, but on the other hand, it is difficult to sufficiently obtain a reproduction output, which results in a difficulty in securing the S/N ratio having a sufficient size.

A perpendicular magnetic recording medium has been used in recent years in order to secure thermal stability of the medium as mentioned above.

In order to achieve higher recording densification even in the perpendicular magnetic recording, it is necessary to increase the track density. In addition, in the perpendicular magnetic recording medium, it is necessary to reduce the recording blur (fringe) of the recording end which causes a problem by increasing the track density.

An example of a method of solving this fringe includes a discrete medium (see, for example, Japanese Unexamined Patent Application Publication Nos. H6-259709 and H9-97419).

Japanese Unexamined Patent Application Publication No. H6-259709 discloses a structure of a discrete medium in which a data section is formed of a projection portion and a nonmagnetic section is formed of a recess portion. However, provision of a recess portion-type nonmagnetic section causes irregularities to exist on the disk surface, and thus is not preferable due to an adverse effect on the levitation of a recording/reproducing head.

Japanese Unexamined Patent Application Publication No. H9-97419 discloses a method of forming a magnetic recording layer on a glass disk substrate, forming a groove for disposing a magnetic recording section and a nonmagnetic section by patterning the magnetic recording layer, then forming a nonmagnetic film (film used as a base material of the nonmagnetic section) so as to fill the groove by a sputtering method, and thereafter forming the nonmagnetic section in the groove by removing a portion located above the upper surface of the magnetic recording section in the nonmagnetic film by ion beam etching.

In addition, it discloses that an oxide, a nitride, a carbide, a boride, a polymeric compound, and the like are used as a material of the nonmagnetic film.

However, when the nonmagnetic film is formed by a sputtering method using materials such as the above-mentioned oxide, nitride, carbide, boride, or polymeric compound, the thicknesses of the nonmagnetic films formed on a plurality of magnetic recording sections are different from each other depending on the shapes of the magnetic recording sections (for example, widths or areas when seen in a plan view).

For this reason, when the nonmagnetic section is formed by removing the nonmagnetic film until the surfaces of a plurality of magnetic recording sections are exposed by ion beam etching, the surface of the nonmagnetic film included in the nonmagnetic section becomes lower than the surface of the magnetic recording section (a recess is generated), and the irregularities are formed on the surface composed of the surface of the magnetic recording section and the surface of the nonmagnetic film in which ion beam etching is performed (hereinafter, referred to as the "etched surface"), whereby there has been a problem that the surface of the magnetic recording medium cannot be formed smoothly.

When such a magnetic recording medium having no smooth surface is incorporated into the magnetic recording/reproducing device, there has been a concern that the magnetic head may become broken, or a concern that the magnetic recording/reproducing device may not operate normally.

In addition, when the nonmagnetic film is formed using the sputtering method which does not have preferable filling characteristics, a gap is formed between the nonmagnetic section and the magnetic recording section, whereby there has been a problem in that the magnetic recording medium corrodes from the above-mentioned gap due to the environment of use of the magnetic recording/reproducing device.

The related art aimed at improving such a problem of Japanese Unexamined Patent Application Publication No. H9-97419 includes Japanese Unexamined Patent Application Publication No. 2005-100496.

Japanese Unexamined Patent Application Publication No. 2005-100496 discloses a method of applying an ultraviolet curable resin as a nonmagnetic film so as to fill a groove by a spin coating method, curing the ultraviolet curable resin by ultraviolet irradiation, and thereafter forming a nonmagnetic section in the groove by removing an unnecessary portion of the ultraviolet curable resin through ion beam etching.

In this manner, it is possible to suppress the formation of a gap between the groove and the ultraviolet curable resin by filling the ultraviolet curable resin into the groove using the spin coating method having filling characteristics superior to that of the sputtering method. That is, it is possible to suppress the corrosion of the magnetic recording medium from the above-mentioned gap.

In addition, it is possible to reduce the irregularities formed in the etched surface, further than in the case where the nonmagnetic section is formed by the method disclosed in Japanese Unexamined Patent Application Publication No. H9-97419, by forming the nonmagnetic section by the method disclosed in Japanese Unexamined Patent Application Publication No. 2005-100496.

However, when the ultraviolet curable resin is spin-coated on the surface of the magnetic layer (magnetic recording section) of which the irregularities are processed by the method disclosed in Japanese Unexamined Patent Application Publication No. 2005-100496, there may be a case where the irregularities (for example, the irregularities having a size of approximately 10 nm) are formed on the surface of the ultraviolet curable resin due to the shape of the magnetic recording section or non-uniformity of the ultraviolet curable resin (specifically, for example, non-uniformity of distribution of components included in the ultraviolet curable resin). Such irregularities may be generated by the influence of surface tension of the resin in the projection-shaped magnetic recording section, and are formed on the surface of the resin even in the case where a resin other than the ultraviolet curable resin is used.

In addition, there has been a problem in that the curing rate of the ultraviolet curable resin becomes non-uniform in the film. In particular, the curing rate in the surface of the film is high. On the other hand, the curing rate of the resin buried in the recess portion of the magnetic layer is low, whereby the distortion occurs within the cured ultraviolet curable resin, which results in the occurrence of a recess in the nonmagnetic section (resin buried in the recess portion of the magnetic layer) at the time of planarizing a resin layer.

As a method of reducing such irregularities formed on the surface of the resin, it is considered that the thickness of the resin is increased. However, when the thickness of the resin is increased, the thickness of the resin to be removed by ion beam etching increases, and thus the etching time is prolonged. When ion beam etching is performed for a long time, the etched surface of the nonmagnetic film is roughened, and thus the surface of the magnetic recording medium cannot be formed smoothly.

In addition, it is also considered that the surface tension of the resin in the projection-shaped magnetic recording section is lowered by lowering the viscosity of the resin. However, this narrows the range of choices for the resin capable of being used as a filling material.

SUMMARY OF THE INVENTION

The invention is proposed in view of such circumstances of the related art, and an object of the invention is to provide a method of manufacturing a magnetic recording medium and a magnetic recording/reproducing device which is capable of expanding the range of choices for the resin included in the nonmagnetic section and has a smooth surface.

The inventor has found, as a result of diligent research in order to solve the above-mentioned problems, that it is possible to expand the range of choices for the resin included in the nonmagnetic section and to make the surface of the resin smooth even in the case where the thickness of the resin is reduced by the steps of: forming a magnetic layer on at least one surface of a nonmagnetic substrate; forming a groove in which a nonmagnetic section is formed by etching a portion corresponding to a formation region of the nonmagnetic section in the magnetic layer and a magnetic recording section formed of the magnetic layer; applying a resin having an active energy ray curable functional group to the surface of the magnetic recording section so as to fill the groove; and pressing a plate material against the resin so that the smooth surface of the plate material is in contact with the surface of the resin, to make the surface of the resin smooth.

In addition, it was discovered that since the resin having an active energy ray curable functional group is cured in a state where the surface thereof is covered with the plate material, the surface of the resin does not react with oxygen in the atmosphere at the time of curing, and the resin is uniformly cured, thereby allowing the distortion in the resin to be reduced.

In addition, it was discovered that since the resin is cured by irradiation with an active energy ray through the light-transmitting plate material, the resin is uniformly cured, thereby allowing the distortion in the cured resin to be reduced.

In addition, it was discovered that after the surface of the resin is made smooth, the plate material is removed from the resin, and then, the portion located above the surface of the magnetic recording section in the resin having a smooth surface is removed by etching, thereby allowing the amount of recess (the amount of depression formed on the surface of the resin when based on the surface of the magnetic recording section) of the surface of the resin (surface of the nonmagnetic section) by etching to be reduced.

In addition, it was discovered that since the etching time of the resin is shortened by reducing the thickness of the resin, the surface of the etched resin (surface of the nonmagnetic section) can be made smooth.

According to the method of manufacturing a magnetic recording medium of the invention, it is possible to expand the range of choices for the resin included in the nonmagnetic section and to make the surface composed of the surface of the magnetic recording section and the surface of the nonmagnetic section smooth. Therefore, it is found that the magnetic recording medium having a smooth surface can be formed, which leads to the completion of the invention.

That is, the invention provides the following configurations.

(1) A method of manufacturing a magnetic recording medium, including the steps of: forming a magnetic layer on at least one surface of a nonmagnetic substrate; forming a groove in which a nonmagnetic section is formed by etching a portion corresponding to a formation region of the nonmagnetic section in the magnetic layer and a magnetic recording section formed of the magnetic layer; applying a resin having an active energy ray curable functional group to the surface of the magnetic recording section so as to fill the groove; pressing a plate material against the resin so that the smooth surface of the plate material is in contact with the surface of the resin to make the surface of the resin smooth; removing the plate material from the resin after the step of pressing the plate material; and forming the nonmagnetic section in the groove by etching and removing a portion located above the surface of the magnetic recording section in the resin having a smooth surface after the step of removing the plate material.

(2) The method of manufacturing a magnetic recording medium according to the above (1), wherein in the step of pressing the plate material, the plate material is pressed against the resin within an atmosphere having a lower pressure than an atmospheric pressure.

(3) The method of manufacturing a magnetic recording medium according to the above (1) or (2), wherein in the step of pressing the plate material, a light-transmitting plate material having a light-transmitting property as the plate material is pressed against the resin to make the surface of the resin smooth, and a step of curing the resin is provided between the step of pressing the plate material and the step of removing the plate material by irradiating the resin with light through the light-transmitting plate material.

(4) The method of manufacturing a magnetic recording medium according to any one of the above (1) to (3), further including the step of forming a protective film on the surface of the magnetic recording section and the surface of the nonmagnetic section, after the step of forming the nonmagnetic section.

(5) The method of manufacturing a magnetic recording medium according to any one of the above (1) to (4), wherein the resin includes an organosilicon compound.

(6) The method of manufacturing a magnetic recording medium according to any one of the above (1) to (5), wherein in the step of applying the resin, the resin is applied to the surface of the magnetic recording section by a spin-on coating method.

(7) The method of manufacturing a magnetic recording medium according to any one of the above (1) to (5), wherein in the step of applying the resin, the resin is applied to the surface of the magnetic recording section by a dipping method.

(8) The method of manufacturing a magnetic recording medium according to any one of the above (1) to (7), wherein in the step of forming the nonmagnetic section, the resin is etched by an ion beam etching method.

(9) The method of manufacturing a magnetic recording medium according to any one of the above (1) to (8), wherein the active energy ray curable functional group includes at least one selected from a group consisting of an epoxy group, an acryl group, a methacryl group, and an oxetanyl group.

(10) A magnetic recording/reproducing device including: a magnetic recording medium formed by the method of manufacturing a magnetic recording medium according to any one of the above (1) to (9); a medium drive section that drives the magnetic recording medium in the recording direction; a magnetic head that records and reproduces information on the magnetic recording medium; a head moving section that moves the magnetic head onto the magnetic recording medium; and a recording/reproducing signal processing section that processes a recording/reproducing signal from the magnetic head.

According to the invention, it is possible to expand the range of choices for the resin included in the nonmagnetic section and to make the surface of the magnetic recording medium smooth.

DETAILED DESCRIPTION

Figure 1:
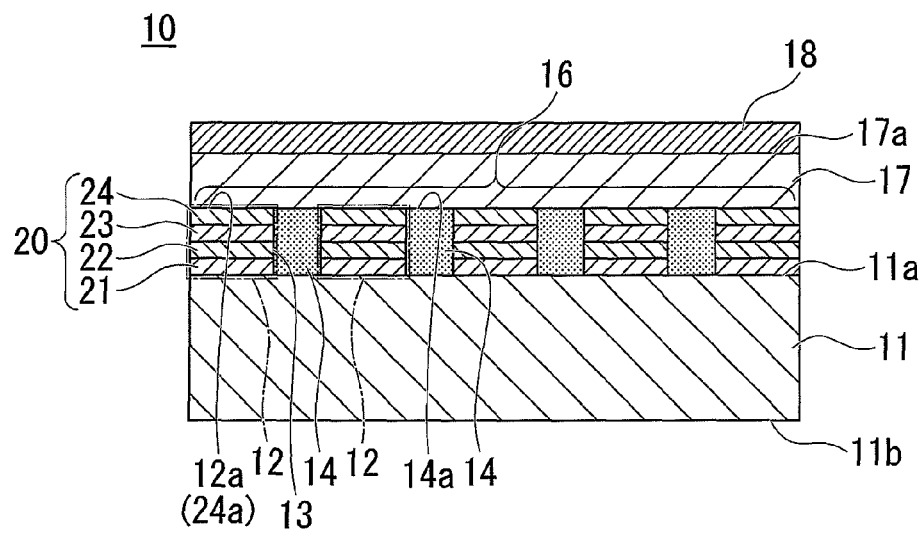
FIG. 1 is a cross-sectional view illustrating an outline of a magnetic recording medium according to an embodiment of the invention.

Hereinafter, the embodiment of the invention will be described in detail with reference to the drawings. In the drawings used in the following description, the featuring portions of the invention may be enlarged, for convenience, in order to make the features thereof easier to understand, and the dimension ratios and the like for each of the components are not limited to the same dimensions as in reality.

Embodiment

FIG. 1 is a cross-sectional view illustrating an outline of a magnetic recording medium according to an embodiment of the invention. In FIG. 1, a perpendicular magnetic recording medium is shown as an example of a magnetic recording medium 10 of the embodiment. However, the magnetic recording medium 10 may be other magnetic recording mediums (for example, longitudinal magnetic recording type recording medium), and is not limited to the perpendicular magnetic recording medium.

Referring to FIG. 1, the magnetic recording medium 10 according to the embodiment is a perpendicular magnetic recording medium, and includes a nonmagnetic substrate 11, magnetic recording sections 12, grooves 13, nonmagnetic sections 14, a protective film forming surface 16, a protective film 17, and a lubricant layer 18.

The nonmagnetic substrate 11 is a plate-shaped substrate. It is possible to use, as the nonmagnetic substrate 11, for example, an Al alloy substrate such as an Al—Mg alloy containing Al as a main ingredient, a crystallized glass substrate, an amorphous glass substrate, a silicon substrate, a substrate made of titanium, a ceramic substrate, a substrate made of carbon, a resin substrate, and the like.

As the crystallized glass substrate, for example, a lithium-based crystallized substrate can be used. In addition, as the amorphous substrate, for example, a soda-lime glass substrate or an aluminosilicate glass substrate and the like can be used.

The magnetic recording sections 12 are provided on the surface 11a of the nonmagnetic substrate 11. The magnetic recording sections 12 are disposed at predetermined intervals from the center of the nonmagnetic substrate 11 to the outer circumference of the nonmagnetic substrate 11.

The magnetic recording section 12 is formed with a laminated structure 20 in which a soft magnetic underlayer 21, a seed layer 22, an intermediate layer 23, and a recording layer 24 which is a magnetic layer are sequentially laminated. In this example, although a case where the groove 13 for forming the nonmagnetic section 14 is formed over the entire magnetic recording section 12 has been described by way of example, the groove 13 may be formed in a portion of the magnetic recording section 12, for example, only in the recording layer 24.

The soft magnetic underlayer 21 is a layer for efficiently applying perpendicular components of a recording magnetic field to the recording layer 24 by leading the recording magnetic field from a magnetic head when a signal is recorded on the magnetic recording medium 10.

The soft magnetic underlayer 21 is provided on the surface 11a of the nonmagnetic substrate 11. The soft magnetic underlayer 21 is formed of a soft magnetic material. As a soft magnetic material of the soft magnetic underlayer 21, for example, a FeCo-based alloy, a FeTa-based alloy, a Co-based alloy and the like can be used. As the FeCo-based alloy, for example, a FeCoB alloy, a FeCoSiB alloy, a FeCoZr alloy, a FeCoZrB alloy, and the like can be used. As the FeTa-based alloy, for example, a FeTaN alloy, a FeTaC alloy, and the like can be used. As the Co-based alloy, for example, a CoTaZr alloy, a CoZrNb alloy, a CoB alloy, a NiW alloy, and the like can be used.

The seed layer 22 is provided between the soft magnetic underlayer 21 and the intermediate layer 23. The seed layer 22 is a layer for improving a crystal orientation of the intermediate layer 23. As a material of the seed layer 22, for example, a material having an amorphous structure can be used. As such a material, it is possible to use, for example, a CrTi alloy, a CrMn alloy, a CrFe alloy, and the like having an amorphous structure at a thickness of approximately 10 nm.

The intermediate layer 23 is provided between the seed layer 22 and the recording layer 24. The intermediate layer 23 is a layer having a function of improving a crystal orientation of the recording layer 24, and a function of adjusting the crystal size of the recording layer 24.

As a material of the intermediate layer 23, for example, a material having a hexagonal close-packed structure (also referred to as an "hcp structure") or a face-centered cubic structure (also referred to as an "fcc structure") may preferably be used. As a material of the intermediate layer 23 having such a structure, Ru, a Ru alloy or the like can be used.

The total thickness obtained by adding the thickness of the seed layer 22 to the thickness of the intermediate layer 23 may be set to, for example, 30 nm or less. When the total thickness obtained by adding the thickness of the seed layer 22 to the thickness of the intermediate layer 23 exceeds 30 nm, the distance between the magnetic head and the soft magnetic underlayer 21 at the time of recording/reproducing increases, which is not preferable because the OW characteristics (Overwrite characteristics) or the resolution of a reproducing signal decreases.

The recording layer 24 is provided on the intermediate layer 23. It is preferable to provide the recording layer 24 in a direction (that is, vertical direction) in which a magnetization easy axis is perpendicular to the surface 11a of the nonmagnetic substrate 11.

As a material of the recording layer 24, for example, a magnetic alloy having a granular structure can be used. Particularly, as a material of the recording layer 24, for example, a magnetic material having a granular structure which includes at least Co, Pt, and an oxide is preferably used.

In addition, it is preferable to add Cr, B, Cu, Ta, Zr or the like to a paramagnetic material, for the purpose of improving the SNR (Signal-to-Noise Ratio) characteristics.

As an oxide contained in the recording layer 24, $SiO_2$, SiO, $Cr_2O_3$, CoO, $Ta_2O_3$, and $TiO_2$ can be used.

The volume percentage of the above-mentioned oxide may be set to, for example, 15 to 40% by volume. When the volume percentage of the oxide is less than 15% by volume, this is not preferable because the SNR characteristics become insufficient. In addition, when the volume percentage of the oxide exceeds 40% by volume, this is not preferable because a coercive force just corresponding to the high recording density cannot be obtained.

In addition, the thickness of the recording layer 24 is preferably set to be in a range of, for example, 6 to 18 nm. When the thickness of the recording layer 24 is set to be in a range of 6 to 18 nm, a sufficient output can be secured, which is preferable because deterioration of the OW characteristics does not occur.

The surface 12a of the magnetic recording section 12 (surface equivalent to the surface 24a of the recording layer 24) configured in this manner has a smooth surface.

The groove 13 is formed between the magnetic recording sections 12. The groove 13 is a groove for disposing the nonmagnetic section 14. The groove 13 is formed by etching the laminated structure 20 of the portion corresponding to the formation region of the nonmagnetic section 14 after the laminated structure 20, in which the soft magnetic underlayer 21, the seed layer 22, the intermediate layer 23, and the recording layer 24 are sequentially laminated, is formed.

In FIG. 1, although the groove 13 is formed so as to separate the magnetic recording sections 12 disposed at positions adjacent to each other, the groove 13 may be formed so as to divide at least a portion of the recording layer 24.

The nonmagnetic section 14 is provided so as to fill the groove 13, and separates the magnetic recording sections 12 disposed at positions adjacent to each other. The nonmagnetic section 14 is formed of a nonmagnetic material. As a nonmagnetic material of the nonmagnetic section 14, for example, a resin 41 (see FIG. 9) including an organosilicon compound with an active energy ray curable functional group may be used.

The active energy ray mentioned in the invention means a general term of ionizing radioactive rays or electromagnetic waves such as electron rays, ultraviolet rays, or gamma rays.

The active energy ray curable functional group can include, for example, at least one selected from a group consisting of an epoxy group, an acryl group, a methacryl group, and an oxetanyl group.

In addition, when curing is performed by ultraviolet lay irradiation, a photo (polymerization) initiator for generating a radical or an acid by ultraviolet ray irradiation is preferably included in the above-mentioned resin 41, as necessary.

In particular, when the active energy ray curable functional group is an epoxy group or when the active energy ray curable functional group is an epoxy group and has a compound with a vinyl ether group included in the resin 41, as a polymerization initiator, it is possible to use, for example, a sulfonium salt-based polymerization initiator such as triphenylsulfonium hexafluoroantimonate or light cation polymerization initiators such as iodonium salts, diazonium salts, and allene-ion complexes, and the like.

The above-mentioned polymerization initiator can be used alone or in combination of two or more, and is preferably used in a range of 0.01 to 10 parts by mass with respect to 100 parts by mass of the curable composition.

Additive agents, such as a viscosity modifier, a dispersant, and a surface conditioner, in addition to a polymerization initiator and a curing agent can be added to the curable composition of the invention (in the embodiment, the resin 41 shown in FIG. 9, described later, which is used as a base material of the nonmagnetic section 14).

In this case, the total is preferably set to be 30 parts by mass or less with respect to the total 100 parts by mass of the curable composition.

In addition, a solvent or the like can be added to the curable composition of the invention, as necessary, in order to improve application properties. Such a solvent can include, for example, a ketone-based solvent such as methyl isobutyl ketone, an aromatic hydrocarbon solvent such as toluene or xylene, an ester-based solvent such as ethyl acetate, butyl acetate, or propylene glycol monomethyl ether acetate, or an alcohol-based solvent such as 2-propanol, butanol and hexanol propylene glycol mono-n-propyl ether, and ethylene glycol monoethyl ether, or the like.

In the embodiment, a case where the resin 41 (ultraviolet ray cured resin) cured by ultraviolet ray irradiation is used as a base material of the nonmagnetic section 14 will be described below by way of example.

In addition, the organosilicon compound mentioned in the invention is a general term for an organic compound having a carbon-silicon bond, and the organosilicon compound can include, for example, organic silane, siloxide, silyl hydride, or silene, but is not limited thereto.

A resin including the organosilicon compound with the active energy ray curable functional group has resistance to etching, by using the resin 41 including the organosilicon compound with the active energy ray curable functional group as a material (base material) of the nonmagnetic section 14. Therefore, when etched in the step shown in FIG. 13 described later, the surface 41a of the resin 41 (surface 14a of the nonmagnetic section 14) after being etched can be made smooth.

The surface 14a of the nonmagnetic section 14 becomes smooth and is flush with the surface 12a of the magnetic recording section 12.

The protective film forming surface 16 is composed of the surface 12a of the magnetic recording section 12 and the surface 14a of the nonmagnetic section 14. The protective film 17 is formed on the protective film forming surface 16. As previously described, since the surface 14a of the nonmagnetic section 14 having a smooth surface with no recess is flush with the surface 12a of the magnetic recording section 12, the protective film forming surface 16 has a smooth surface.

Thereby, the surface of the magnetic recording medium 10 of the embodiment has a smooth surface.

The protective film 17 is a film for preventing the magnetic recording section 12 from being damaged when the magnetic head is in contact with the magnetic recording medium 10.

The protective film 17 is formed on the protective film forming surface 16 having a smooth surface (for example, the average roughness Ra of the surface thereof is 0.1 nm or less). Thereby, since the shape of the protective film forming surface 16 having a smooth surface is transferred to the surface 17a of the protective film 17 (surface equivalent to the surface of the magnetic recording medium 10), the surface 17a of the protective film 17 has a smooth surface.

As the protective film 17, a carbon layer can be used. As the protective film 17, a DLC (Diamond Like Carbon) film having an amorphous structure can be used.

The lubricant layer 18 is provided so as to cover the surface 17a of the protective film 17 having a smooth surface. As a lubricant used at the time of forming the lubricant layer 18, a fluorine-based lubricant, a hydrocarbon-based lubricant, the mixture thereof, or the like can be used.

According to the magnetic recording medium of the embodiment, it is possible to make the surface of the magnetic recording medium 10 smooth by making the protective film forming surface 16 composed of the surface 12a of the magnetic recording section 12 and the surface 14a of the nonmagnetic section 14 smooth.

Figure 2:
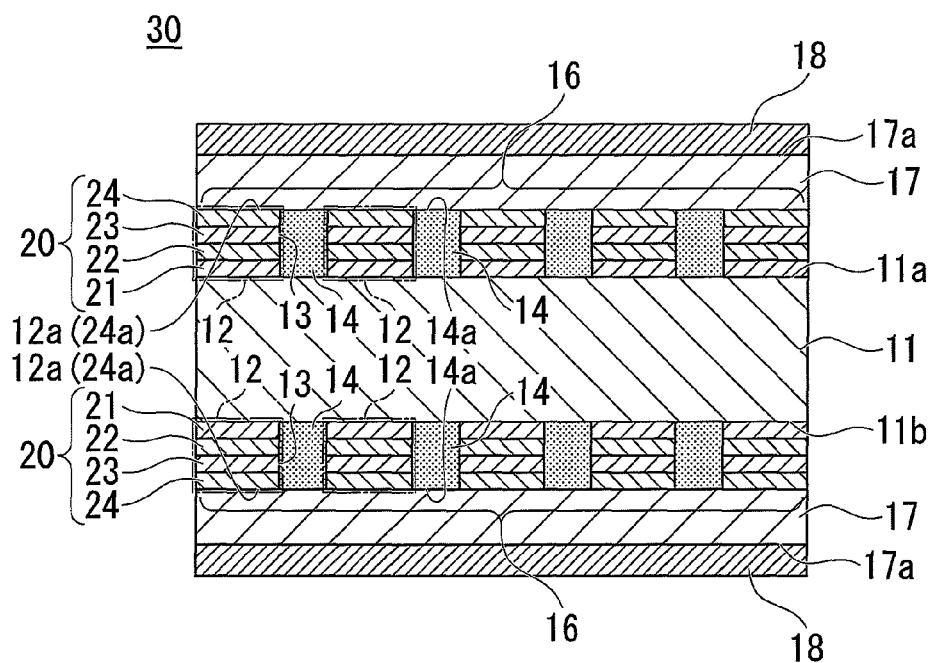
FIG. 2 is a cross-sectional view illustrating an outline of a magnetic recording medium according to a modified example of the embodiment of the invention.

FIG. 2 is a cross-sectional view illustrating an outline of the magnetic recording medium according to a modified example of the embodiment of the invention.

In FIG. 2, the same reference signs are assigned to the same components as those of the magnetic recording medium 10 shown in FIG. 1.

In FIG. 1, although a case where the magnetic recording section 12, the groove 13, the nonmagnetic section 14, the protective film forming surface 16, the protective film 17, and the lubricant layer 18 are provided only on the surface 11a of the nonmagnetic substrate 11 has been described by way of example, the magnetic recording section 12, the groove 13, the nonmagnetic section 14, the protective film forming surface 16, the protective film 17, and the lubricant layer 18 may also be provided on the backside 11b of the nonmagnetic substrate 11 as in a magnetic recording medium 30 shown in FIG. 2.

The same effect as that of the magnetic recording medium 10 shown in FIG. 1 can also be obtained in the magnetic recording medium 30 having such a configuration.

FIGS. 3 to 15 are cross-sectional views illustrating steps of manufacturing the magnetic recording medium according to the embodiment of the invention. In FIGS. 3 to 15, the same reference signs are assigned to the same components as those of the magnetic recording medium 10 shown in FIG. 1.

Figure 3:
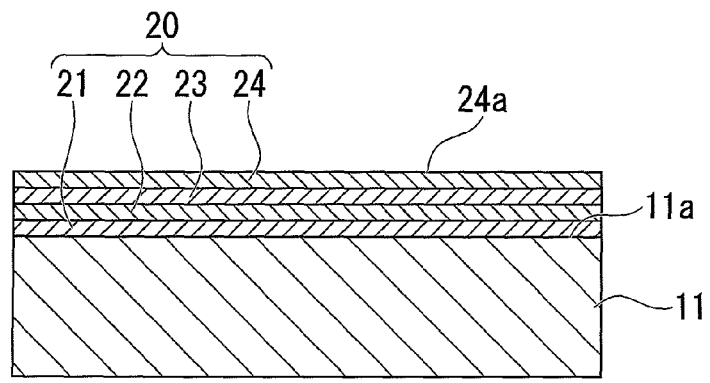
FIG. 3 is a first cross-sectional view illustrating a step of manufacturing the magnetic recording medium according to the embodiment of the invention.

To begin with, in the step shown in FIG. 3, the laminated structure 20 is formed by sequentially laminating the soft magnetic underlayer 21, the seed layer 22, the intermediate layer 23, and the recording layer 24 which is a magnetic layer on the surface 11a of the nonmagnetic substrate 11 by a well-known method (step including a step of forming a magnetic layer).

The average surface roughness Ra of the surface 11a of the nonmagnetic substrate 11 may be set to, for example, 1 nm or less and preferably 0.5 nm or less.

The good vertical orientation of the recording layer 24 formed in the step shown in FIG. 3 is obtained by setting the average surface roughness Ra of the surface 11a of the non-magnetic substrate 11 to 0.5 nm or less.

In addition, the minute wave Wa of the surface 11a of the nonmagnetic substrate 11 may be set to, for example, 0.3 nm or less. Thereby, when a stamper 36 is pressed against a resist film 35 in the step shown in FIG. 6 described later to thereby form grooves 39 in the resist film 35, the pressure difference within the surface 11a of the nonmagnetic substrate 11 becomes small, thereby allowing the grooves 39 to be formed in the resist film 35 with a high degree of accuracy.

In addition, the laminated structure 20 is, for example, formed by sequentially forming the materials of the soft magnetic underlayer 21, the seed layer 22, the intermediate layer 23, and the recording layer 24, which are described in FIG. 1, by a sputtering method.

Figure 4:
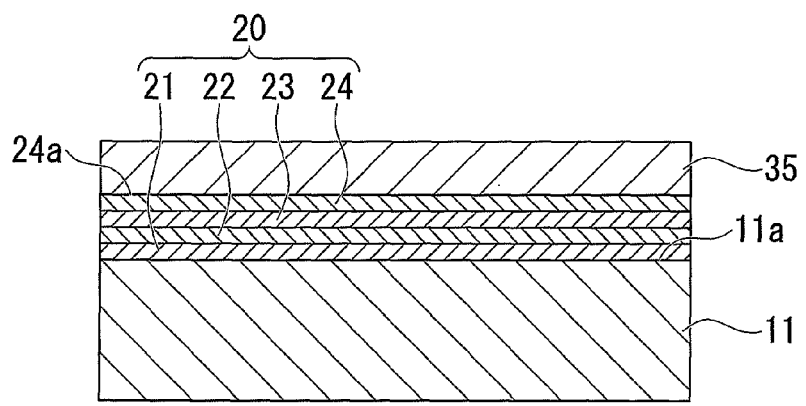
FIG. 4 is a second cross-sectional view illustrating a step of manufacturing the magnetic recording medium according to the embodiment of the invention.

Next, in the step shown in FIG. 4, the resist film 35 is formed on the surface 24a of the recording layer 24.

Figure 5:
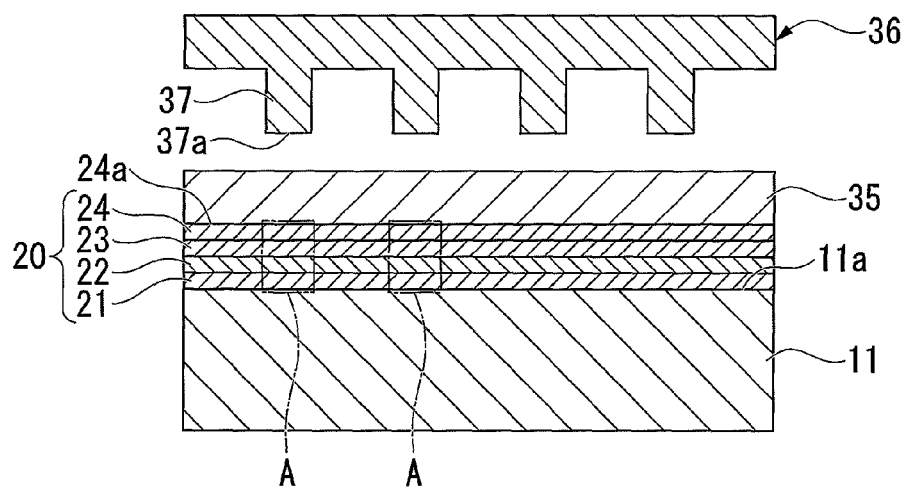
FIG. 5 is a third cross-sectional view illustrating a step of manufacturing the magnetic recording medium according to the embodiment of the invention.

Next, in the step shown in FIG. 5, the stamper 36 having projection portions 37 corresponding to the shape of the groove 13 shown in FIG. 1 is prepared. Next, the stamper 36 is disposed above the resist film 35 so that the portions corresponding to the formation regions A of the nonmagnetic section 14 in the resist film 35 and the projection portions 37 face each other. Meanwhile, the grooves 13 are formed in the formation regions A of the nonmagnetic section 14.

Figure 6:
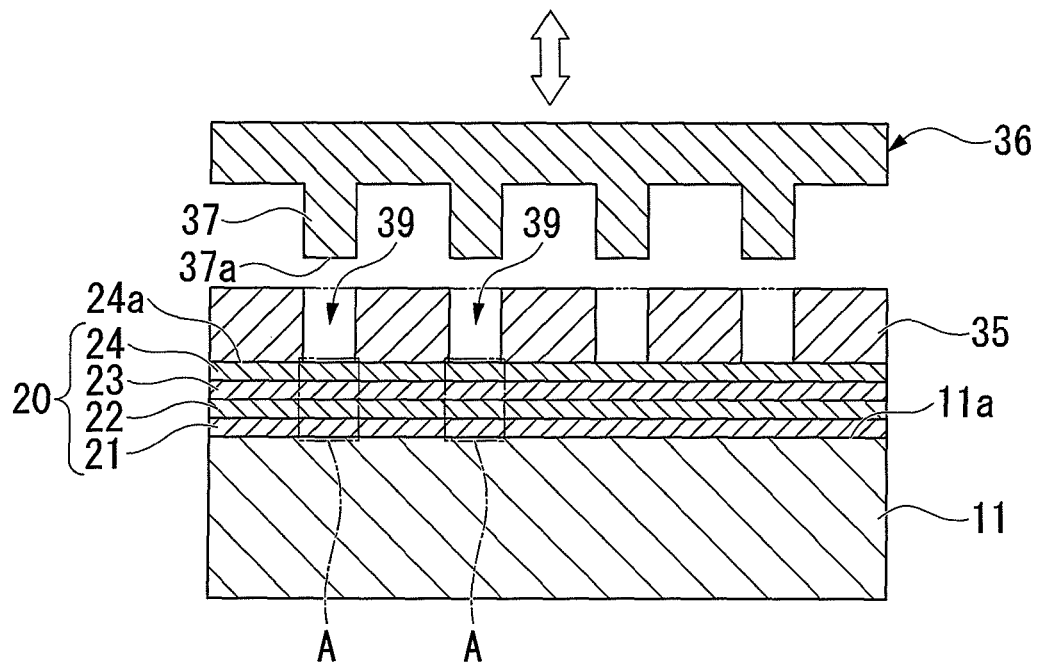
FIG. 6 is a fourth cross-sectional view illustrating a step of manufacturing the magnetic recording medium according to the embodiment of the invention.

Next, in the step shown in FIG. 6, the grooves 39 are formed in the resist film 35, as shown in FIG. 6, by pressing the stamper 36 against the resist film 35 shown in FIG. 5 and then detaching the stamper 36 from the resist film 35.

When the end surface 37a of the projection portion 37 of the stamper 36 is in contact with the surface 24a of the recording layer 24 as much as possible, the stamper 36 is pressed against the resist film 35.

Figure 7:
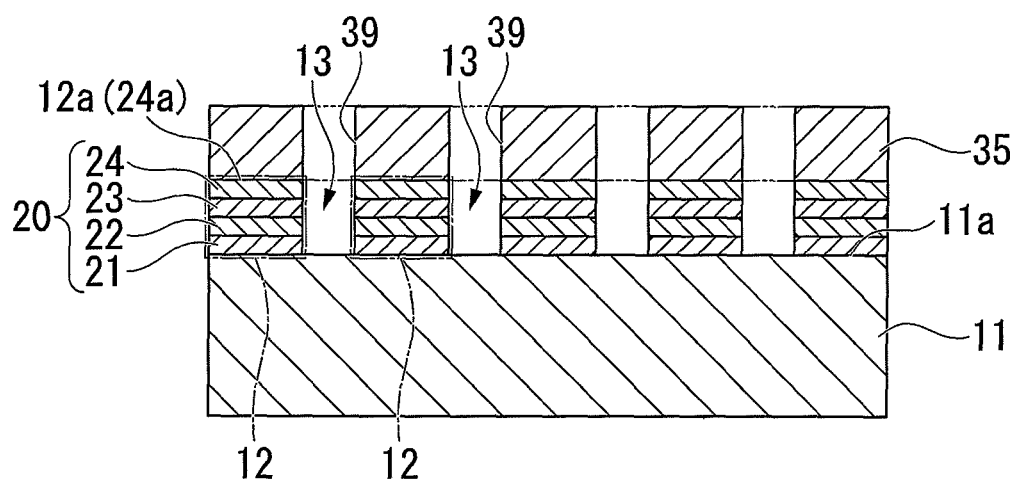
FIG. 7 is a fifth cross-sectional view illustrating a step of manufacturing the magnetic recording medium according to the embodiment of the invention.

Next, in the step shown in FIG. 7, the, groove 13 and the magnetic recording section 12 composed of the soft magnetic underlayer 21, the seed layer 22, the intermediate layer 23, and the recording layer 24 are formed by removing the portion corresponding to the formation region of the groove 13 (portion corresponding to the formation region A of the nonmagnetic section 14 shown in FIG. 6) in the laminated structure 20 through anisotropic etching (for example, ion beam etching) for masking the resist film 35 in which the groove 39 is formed (step of forming a groove and a magnetic recording section).

In FIG. 6, although a case is shown by way of example in which the groove 13 is formed so as to pass through the soft magnetic underlayer 21, the seed layer 22, the intermediate layer 23, and the recording layer 24, the groove 13 may be formed in at least a portion of the recording layer 24 (magnetic layer), and is not limited to the groove 13 shown in FIG. 6.

Figure 8:
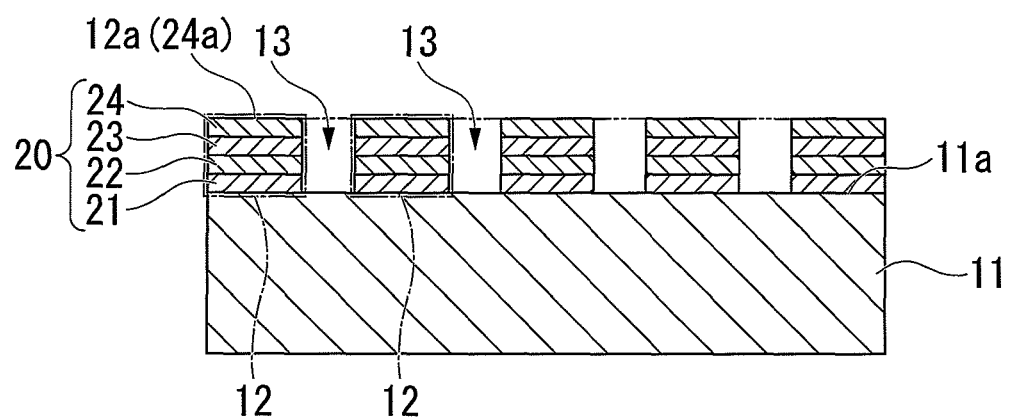
FIG. 8 is a sixth cross-sectional view illustrating a step of manufacturing the magnetic recording medium according to the embodiment of the invention.

Next, in the step of FIG. 8, the resist film 35 shown in FIG. 7 is removed.

Figure 9:
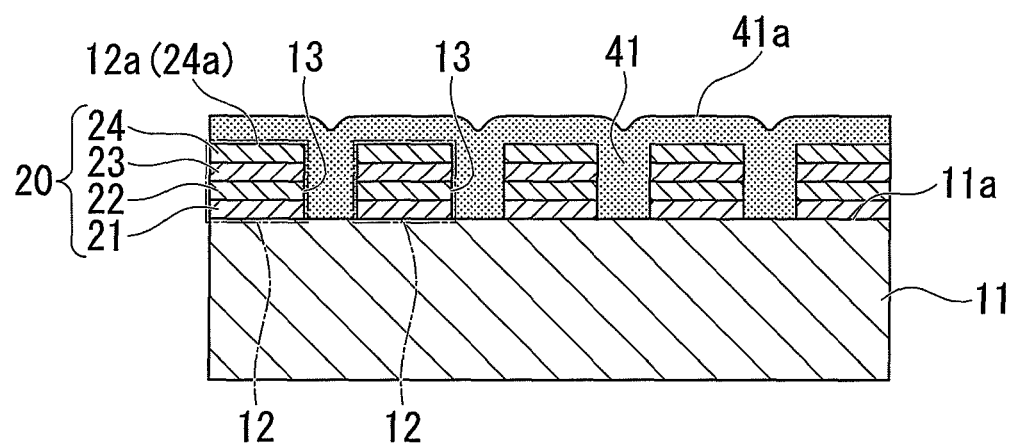
FIG. 9 is a seventh cross-sectional view illustrating a step of manufacturing the magnetic recording medium according to the embodiment of the invention.

Next, in the step shown in FIG. 9, the resin 41 having an active energy ray curable functional group is applied to the surface 12a of the magnetic recording section 12 so as to fill the groove 13 (step of applying a resin).

Specifically, the resin 41 which includes, for example, an organosilicon compound having an active energy ray curable functional group is applied to the surface 12a of the magnetic recording section 12, for example, by a spin coating method or a dipping method.

The resin 41 which includes an organosilicon compound having an active energy ray curable functional group has high wettability to a layer included in the magnetic recording section 12, and has a low surface tension and viscosity.

For this reason, by using, as a base material of the nonmagnetic section 14, the resin 41 which includes an organosilicon compound having an active energy ray curable functional group, it is possible to reliably fill the inside of the groove 13 without forming a gap between the resin and the groove 13 and to reduce the irregularities formed on the surface 41a of the resin 41 after application, compared to other resins (resins free from an organosilicon compound).

In addition, the resin 41 which includes an organosilicon compound having an active energy ray curable functional group has a low shrinking ratio at the time of curing. For this reason, it is possible to suppress occurrence of the distortion in the magnetic recording medium 10 at the time of curing the resin 41.

In addition, the thickness of the resin 41 may preferably be of such an extent to fill the groove 13 therewith. That is, the thickness of the resin 41 may preferably be reduced.

In this manner, since the time of etching of the resin 41 performed in the step shown in FIG. 13 (time of etching for forming the nonmagnetic section 14 in groove 13) described later is shortened by reducing the thickness of the resin 41, it is possible to make the surface 41a of the resin 41 smoother after etching than in cases where the etching time is long (cases where the thickness of the resin 41 is increased).

In the embodiment, a case where the thickness of the resin 41 is reduced will be described below by way of example.

In addition, since the surface 41a of the resin 41 is not easily roughened by etching compared to other resins (resins free from an organosilicon compound), the surface 41a of the resin 41 can be made relatively smooth.

As an active energy ray curable functional group and an organosilicon compound contained in the resin 41, the things as mentioned in the description of the configuration of the nonmagnetic section 14 in FIG. 1 can be used.

In addition, as the resin 41 which includes an organosilicon compound having an active energy ray curable functional group, for example, an ultraviolet curable resin can be used. In this case, a polymerization initiator or a curing agent for ultraviolet curing and the like are added to the resin 41 which includes an organosilicon compound having an active energy ray curable functional group. In the embodiment, a case where an ultraviolet curable resin is used as the above-mentioned resin 41 will be described below by way of example.

Figure 10:
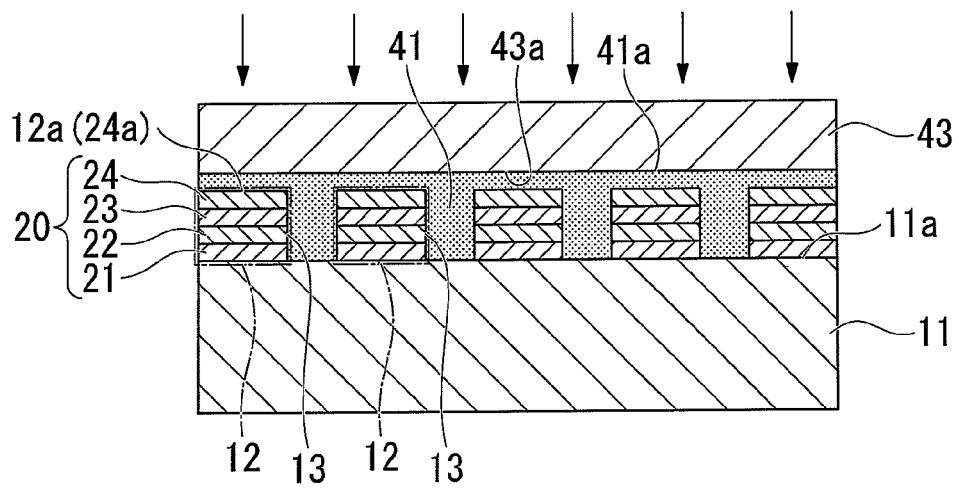
FIG. 10 is an eighth cross-sectional view illustrating a step of manufacturing the magnetic recording medium according to the embodiment of the invention.

Next, in the step shown in FIG. 10, a plate material 43 is pressed against the resin 41 so that a smooth surface 43a of the plate material 43 is in contact with the surface 41a of the resin 51 on which the irregularities shown in FIG. 9 are formed, to thereby make the surface 41a of the resin 41 smooth (step of pressing a plate material).

In this manner, it is possible to expand the range of choices for the resin 41 used as a base material of the nonmagnetic section 14 by making the surface 41a of the resin 41 smooth.

For example, it is also possible to use a resin (resin having high viscosity) by which the irregularities of the surface 41a of the resin 41 after application is made larger than the irregularities shown in FIG. 9.

In addition, since it is not required to consider the sizes of the irregularities formed on the surface 41a of the resin 41 after application by making the surface 41a of the resin 41 smooth, the thickness of the resin 41 can be reduced.

Moreover, in the step of pressing a plate material, the plate material 43 may be pressed against the resin 41 in an atmosphere having a lower pressure than the atmospheric pressure.

In this manner, the plate material 43 is pressed against the resin 41 in an atmosphere having a lower pressure than atmospheric pressure, whereby it is possible to prevent air from entering between the plate material 43 and the resin 41.

In addition, since the resin 41 is cured in a state where the surface thereof is covered with the plate material 43, the surface of the resin 41 does not react with oxygen in the atmosphere at the time of curing, and the resin 41 is uniformly cured, thereby allowing the distortion in the resin 41 to be reduced.

As the plate material 43 used in the step of pressing a plate material, for example, a non-light-transmitting plate material having no light-transmitting property, or a light-transmitting plate material can be used.

As a non-light-transmitting plate material, a metal plate can be used. When a non-light-transmitting plate material is used as the plate material 43, the plate material 43 is removed from the resin 41 after the resin 41 is cured or after the resin 41 is cured to some extent.

As a material of the light-transmitting plate material, resin, glass, quartz and the like can be used. In addition, as the light-transmitting plate material, a film-shaped substrate may be used.

Specifically, as the light-transmitting plate material, a glass substrate having a thickness of 0.5 mm can be used.

In this manner, the light-transmitting plate material is used as the plate material 43, whereby it is possible to irradiate the resin 41 with ultraviolet light in the state where the plate material 43 is contacted (or pressed against) with the resin 41.

In the embodiment, a case where the light-transmitting plate material is used as the plate material 43 will be described by way of example.

Figure 11:
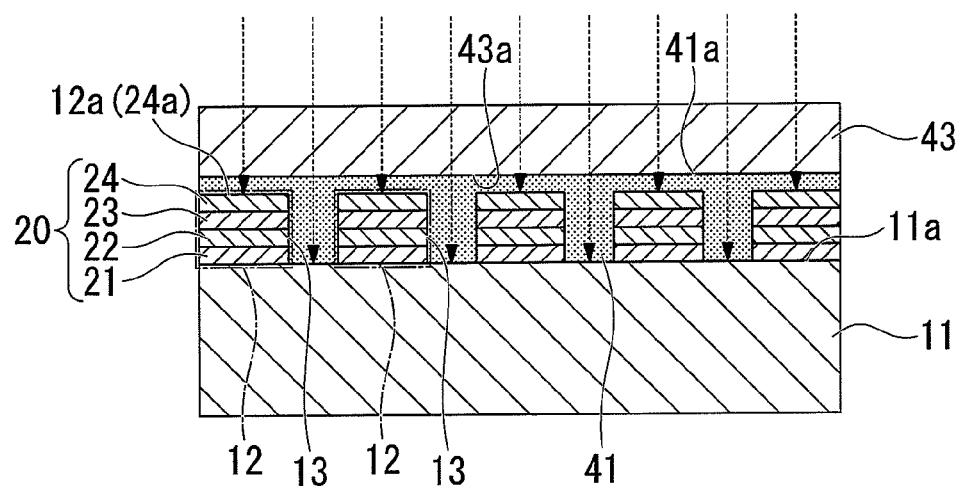
FIG. 11 is a ninth cross-sectional view illustrating a step of manufacturing the magnetic recording medium according to the embodiment of the invention.

Next, in the step shown in FIG. 11, the resin 41 is cured by irradiating the resin with light (for example, ultraviolet light) through the plate material 43 which is a light-transmitting plate material (step of curing the resin).

In this manner, the resin 41 is cured by irradiating the resin 41 with ultraviolet light through the plate material 43 which is a light-transmitting plate material, whereby it is possible to increase the degree of cure of the resin 41 further than in the case where the surface 41a of the resin 41 is cured by directly irradiating it with ultraviolet light.

It is assumed that this is because when the surface 41a of the resin 41 is directly irradiated with ultraviolet light, the ultraviolet light is diffusely reflected at the surface 41a of the resin 41, but in the case of the embodiment, the plate material 43 is brought into contact with the surface 41a of the resin 41, whereby it is possible to suppress the diffused reflection of the ultraviolet light in the surface 41a of the resin 41 and to cure the entire resin 41 at a high curing rate. In addition, as described above, it is assumed that this is because the surface of the resin 41 does not react with oxygen in the atmosphere at the time of curing, and the resin 41 can be uniformly cured, thereby allowing the curing rate of the entire resin 41 to be increased.

Figure 12:
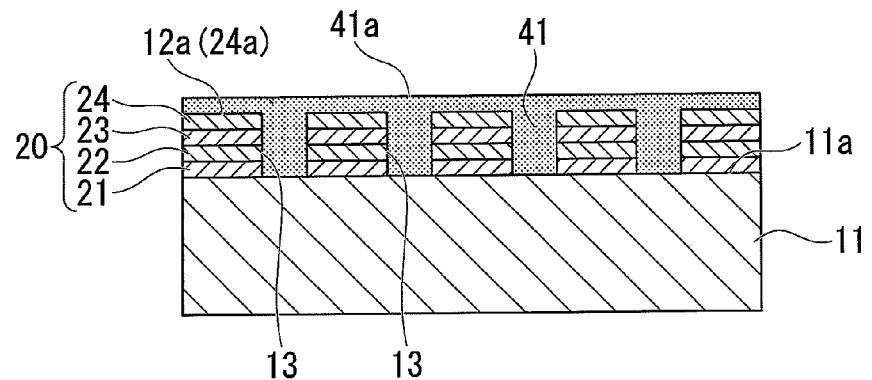
FIG. 12 is a tenth cross-sectional view illustrating a step of manufacturing the magnetic recording medium according to the embodiment of the invention.

Next, in the step shown in FIG. 12, the plate material 43 is removed (step of removing the plate material). Thereby, the surface 41a of the resin 41 having a smooth surface is exposed.

Figure 13:
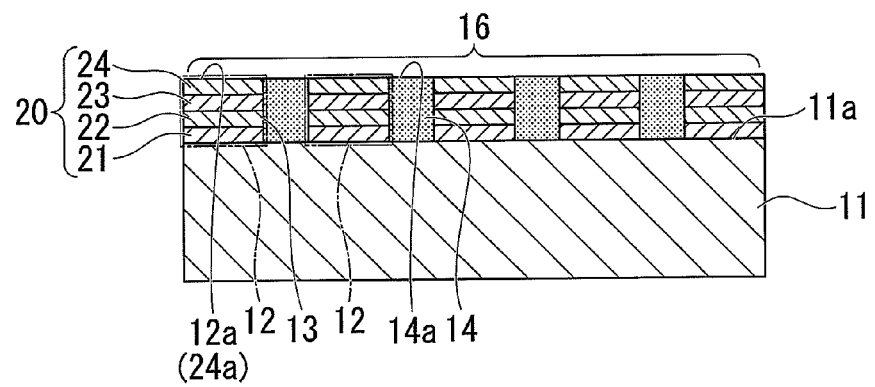
FIG. 13 is an eleventh cross-sectional view illustrating a step of manufacturing the magnetic recording medium according to the embodiment of the invention.

Next, in the step shown in FIG. 13, the nonmagnetic section 14 made of the resin 41 is formed within the groove 13 by etching and removing the portion located above the surface 12a of the magnetic recording section 12 in the resin 41 having the smooth surface 41a (step of forming the nonmagnetic section).

The etching is performed until the surface 12a of the magnetic recording section 12 is exposed. As described in the step shown in FIG. 8 (step of applying the resin), the resin 41 is formed with the reduced thickness. For this reason, it is possible to shorten the time of etching of the resin 41 performed in the step of forming the nonmagnetic section.

Thereby, since there is hardly a case where the resin 41 is roughened by etching the resin 41, it is possible to make the surface 41a of the resin 41 after the etching smooth.

In addition, as described in the step shown in FIG. 11, since the degree of cure of the resin 41 becomes high and the amount of the distortion in the resin 41 is also small, it is possible to reduce the amount of recess of the resin 41 of the portion formed in the groove 13 (the amount of depression formed on the surface 41a of the resin 41 when based on the surface 12a of the magnetic recording section 12) by the etching in the step of forming the nonmagnetic section.

The amount of recess in the embodiment is 1 nm or less, and much smaller than 3 nm which is the amount of recess in the related art.

In this manner, since the surface 12a of the magnetic recording section 12 can be made flush with the surface 41a of the resin 41 having a smooth surface, it is possible to make the surface of the protective film forming surface 16 smooth. That is, the surface of the magnetic recording medium 10 can be made smooth.

In the step of forming the nonmagnetic section, for example, the resin 41 can be etched by ion beam etching.

It is considered that the resin 41 is polished until the surface 12a of the magnetic recording section 12 is exposed by polishing through the use of a CMP (Chemical Mechanical Polishing) method in place of the above-mentioned ion beam etching. However, since the surface 12a of the magnetic recording section 12 is contaminated by impurities or polishing debris when the CMP method is used, the ion beam etching is preferable.

When the resin 41 is polished using the CMP method, it is necessary to remove the impurities or the polishing debris attached to the surface 12a of the magnetic recording section 12.

Figure 14:
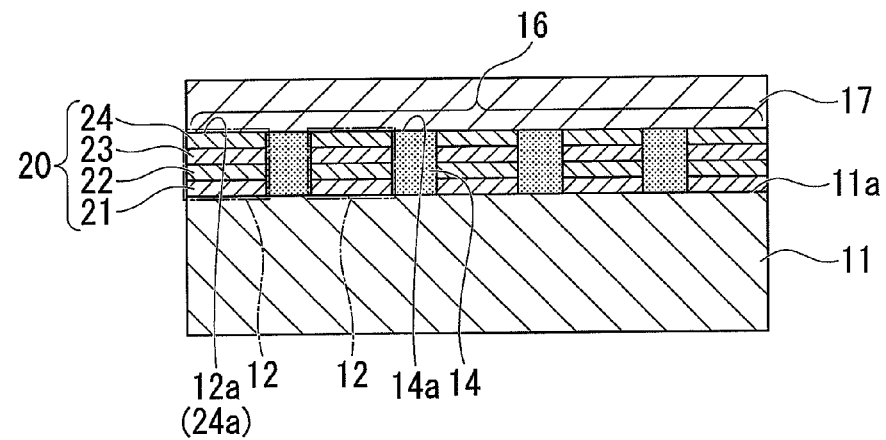
FIG. 14 is a twelfth cross-sectional view illustrating a step of manufacturing the magnetic recording medium according to the embodiment of the invention.

Next, in the step shown in FIG. 14, the protective film 17 for covering the surface 12a of the magnetic recording section 12 and the surface 14a of the nonmagnetic layer 14 is formed (step of forming the protective film).

Specifically, a DLC (Diamond Like Carbon) film is formed by a P-CVD (Plasma-enhanced Chemical Vapor Deposition) method, thereby allowing the protective film 17 made of the DLC film to be formed.

As the protective film 17, it is possible to use a carbonaceous layer such as carbon, hydrogenated carbon, carbon nitride, amorphous carbon, and SiC in addition to the above-mentioned DLC film, or $SiO_2$, $Zr_2O_3$, TiN and the like.

In addition, the protective film 17 may include two layers or more. The thickness of the protective film 17 may be selected within a range of 1 to 10 nm, and preferably 1 to 5 nm. It is preferable that the protective film 17 have a thickness capable of securing durability and be as thin as possible.

Figure 15:
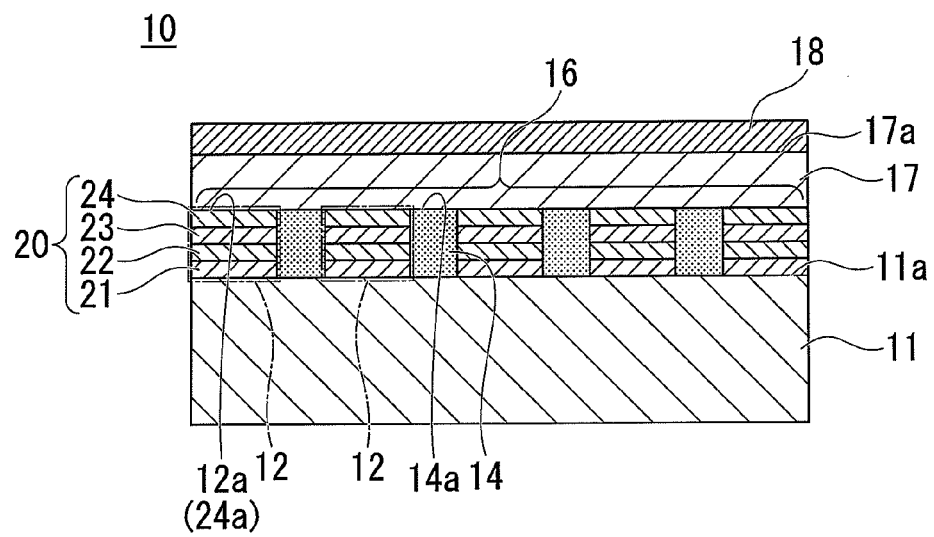
FIG. 15 is a thirteenth cross-sectional view illustrating a step of manufacturing the magnetic recording medium according to the embodiment of the invention.

Next, in the step shown in FIG. 15, the lubricant layer 18 that covers the surface 17a of the protective film 17 is formed. Thereby, the magnetic recording medium 10 shown in FIG. 1 is manufactured.

As a lubricant used at the time of forming the lubricant layer 18, a fluorine-based lubricant, a hydrocarbon-based lubricant, a mixture thereof or the like can be used. The thickness of the lubricant layer 18 can be within a range of 1 to 4 nm.

According to the method of manufacturing the magnetic recording medium of the embodiment, the laminated structure 20 is formed on the surface 11a of the nonmagnetic substrate 11. Next, the groove 13 in which the nonmagnetic section 14 is formed and the magnetic recording section 12 having the laminated structure 20 are formed by etching the portion corresponding to the formation region A of the nonmagnetic section 14 in the laminated structure 20. Next, the resin 41 having an active energy ray curable functional group is applied to the surface 12a of the magnetic recording section 12 so as to fill the groove 13. Then, the plate material 43 is pressed against the resin 41 so that the smooth surface 43a of the plate material 43 is in contact with the surface 41a of the resin 41 to make the surface 43a of the resin 41 smooth. Thereby, since it is not necessary to consider the shape of the irregularities formed on the surface 43a of the resin 41 after application, it is possible to expand the range of choices for the resin 41 included in the nonmagnetic section 14, and to reduce the thickness of the resin 41.

In addition, it is possible to shorten the time of etching of the resin 41 performed when the nonmagnetic section 14 is formed by reducing the thickness of the resin 41, thereby allowing the surface 41a of the resin 41 after etching to be made smooth.

In addition, after the plate material 43 is pressed against the resin 41 to make the surface 43a of the resin 41 smooth, it is possible to reduce the amount of recess of the resin 41 (nonmagnetic section 14) formed in the groove 13 (the amount of depression of the surface 41a of the resin 41 when based on the surface 12a of the magnetic recording section 12) by etching the resin 41.

In addition, since the resin 41 is cured in a state where the surface thereof is covered with the plate material 43, the surface of the resin 41 does not react with oxygen in the atmosphere at the time of curing, and the resin 41 is uniformly cured, thereby allowing the distortion in the resin 41 to be reduced.

In addition, since the plate material 43 is made to have a light-transmitting property and the resin 41 is cured by irradiation with an active energy ray through the light-transmitting plate material 43, the resin 41 is uniformly cured, thereby allowing the distortion in the cured resin 41 to be reduced.

In this manner, the amount of recess of the surface 14a of the nonmagnetic section 14 (surface 41a of the resin 41 after etching) is reduced, and the protective film forming surface 16 including the surface 12a of the magnetic recording section 12 and the surface 14a of the nonmagnetic section 14 is made smooth by making smooth the surface 14a of the nonmagnetic section 14, thereby allowing the surface of the magnetic recording medium 10 to be made smooth.

Figure 16:
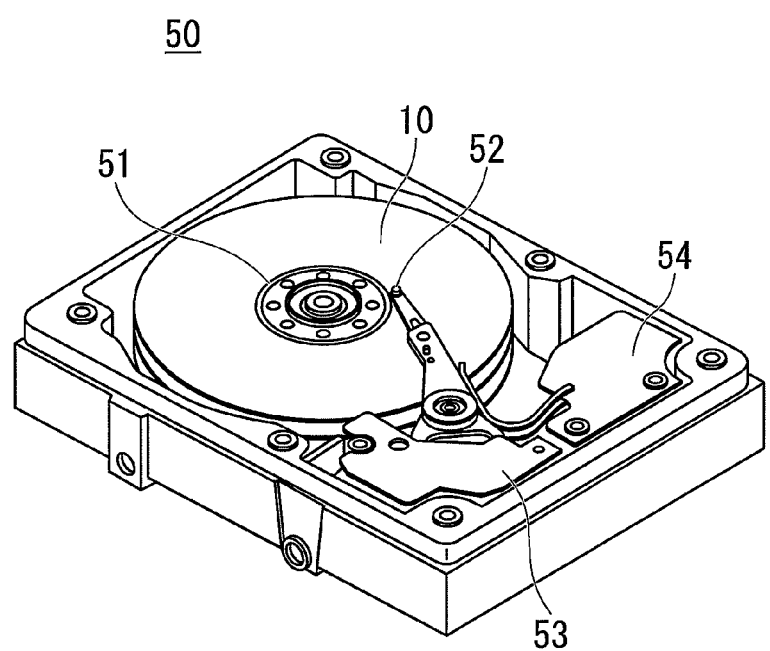
FIG. 16 is a perspective view illustrating an outline of a magnetic recording/reproducing device including the magnetic recording medium shown in FIG. 1.

FIG. 16 is a perspective view illustrating an outline of the magnetic recording/reproducing device including the magnetic recording medium shown in FIG. 1.

Next, the schematic configuration of a magnetic recording/reproducing device 50 including the magnetic recording medium 10 shown in FIG. 1 will be described.

Referring to FIG. 16, the magnetic recording/reproducing device 50 includes the magnetic recording medium 10, a medium drive section 51 that drives the magnetic recording medium 10 in the recording direction, a magnetic head 52 that records and reproduces information on the magnetic recording medium 10, a head moving section 53 that moves the magnetic head 52 onto the magnetic recording medium 10, and a recording/reproducing signal processing section 54 that processes a recording/reproducing signal from the magnetic head 52.

For example, a reproducing section of the magnetic head 52 is configured to have a GMR head or a TMR head, whereby it is possible to obtain the sufficient signal strength even at a high recording density and to realize a magnetic recording/reproducing device 50 having a high recording density.

In addition, the amount of levitation of the magnetic head 52 is set to approximately 5 nm, and the magnetic head 52 is levitated to a lower height than in the related art, whereby the high S/N ratio of the device can be obtained with improvement in the output. Therefore, it is possible to provide the magnetic recording/reproducing device 50 having a large capacity and a high reliability.

EXAMPLE

Synthesis of Silsesquioxane Skeleton-Containing Compound by Using Methacryl Group as Active Energy Ray Curable Functional Group To a three-necked flask equipped with a thermometer and a cooling tube, 1.0 g (0.98 mmol) of octakis(dimethylsilyloxy)silsesquioxane (manufactured by Aldrich, PSS-Octakis(dimethylsilyloxy)substituted), 1.98 g (15.7 mmol, 2.0 folds based on a Si—H group) of allyl methacrylate, and 30 ml of toluene were added, and the mixture was stirred at room temperature under an Ar airflow. 0.093 g of 2% divinyl-tetramethyldisiloxane platinum complex solution in xylene (manufactured by GELEST INC.) (the weight of the platinum metal was 1,000 ppm to the load of the raw materials) was added thereto little by little. The mixture was stirred for two hours at room temperature, and then the toluene solvent was distilled away under reduced pressure (% of the skeleton of the formula (1) of the curable resin composition: 20.6%), and the obtained product was dissolved to 10% concentration of the solid content in propylene glycol monomethyl ether acetate.

3 parts of 2-hydroxy-2-methyl-1-phenyl-propane-1-one (manufactured by Darocure 1173 Chiba Speciality Chemical Corp.), a light radical polymerization initiator, was added to 100 parts of the solid content of the obtained solution, and dissolved, and then the solution was filtered with a 0.2 µm filter, and the silsesquioxane skeleton-containing curable composition was adjusted using a methacryl group as the active energy ray-curable functional group. The weight-average molecular weight of the product was about 3,000.

Example, and Comparative Examples 1 and 2

A vacuum chamber in which a glass substrate for HD, finished with cleaning, (having an outer diameter of 0.85 inched, manufactured by O'hara Corp.) was set up was previously vacuum-evacuated to a pressure of $1.0 \times 10^{-5}$ Pa or lower. Further, a soft magnetic underlayer was formed on the above-mentioned substrate by forming 65Fe-25Co-10B (atom %) having a thickness of 50 nm without being heated, Ru having a thickness of 0.8 nm, and subsequently 65Fe-25Co-10B (atom %) having a thickness of 50 nm.

Subsequently, an orientation control film, made of Ru, having a thickness of 20 nm, a recording layer, made of 65Co-10Cr-15Pt-10SiO$_2$ (atom %), having a thickness of 12 nm, and a protective film, made of carbon, having a thickness of 4 nm were formed.

Next, a medium in which the protective film was formed was extracted from inside the vacuum chamber, and a resist was applied to the surface thereof by spin coating. After being applied, the medium was baked at a constant-temperature bath at approximately 100° C. for twenty minutes to remove an extra solvent.

Next, an imprint was made using a stamper of Ni, which was previously prepared, to form a plurality of samples. In the stamper, concentric recess grooves having a track pitch of 150 nm were formed.

Next, these samples were set up within the high vacuum chamber, and the recording layer of the portion of each concentric recess groove (annular groove corresponding to a separation section of a magnetic recording pattern) was removed using ion beam etching.

After that, the above-mentioned silsesquioxane skeleton-containing compound (Example and Comparative Example 1) and SiO$_2$-based spin-on glass (comparative example 2) were deposited on this surface so that the average film thickness was 80 nm. Here, the viscosity of the silsesquioxane skeleton-containing compound used in Example and Comparative Example 1 was 1171 mPa·s.

The deposition of these films was performed by spin coating. The spin coat was performed by dropping a composition of 0.5 ml into the substrate which was set up within a spin coater, rotating the substrate at 500 rpm for 5 seconds, rotating at 3,000 rpm for 2 seconds, and again at 5,000 rpm for 20 seconds.

Subsequently, after quartz glass having a thickness of 0.5 mm was pressed against the surface of the silsesquioxane skeleton-containing compound resin at a pressure of 1 MPa (approximately 8.8 kgf/cm$^2$) for 5 seconds with respect to the sample of Example, weight was removed and a resin was irradiated with ultraviolet light through the quartz glass to cure the resin. The wavelength of the ultraviolet light was set to 250 nm, and the irradiation time was set to 10 seconds. After that, the quartz glass was separated from the cured resin.

After that, the recording layer was exposed at each track portion using ion beam etching, with respect to the samples of Example and Comparative Examples 1 and 2. The depths of the recesses of the nonmagnetic section at this time were 1 nm in Example, 2 nm in Comparative Example 1, and 3 nm in Comparative Example 2.

Finally, a DLC film was formed at a thickness of 4 nm by a CVD method and a lubricating material was applied at a thickness of 2 nm to create a magnetic recording medium. The recess shape of the nonmagnetic section mentioned above was carried over on the surface of the magnetic recording medium without any substantial change.

(Evaluation of Magnetic Recording Medium)

The surface roughness of the magnetic recording mediums of the present Example and Comparative Examples 1 and 2 was measured using an AFM (Atomic Force Microscope). Specifically, the surface roughness (Ra) of the magnetic recording medium of the present Example was measured at a field of view of 10 µm using an AFM manufactured by Digital Instruments Corporation. Other settings were performed in a tapping mode of resolution 256×256 and at a sweep speed of 1 µm/sec. As a result, the surface roughness Ra of the magnetic recording medium of the present Example was 0.21 nm and showed a remarkably low value. On the other hand, the surface roughness Ra of the magnetic recording medium of Comparative Example 1 was 0.38 nm, and the surface roughness Ra of the magnetic recording medium of Comparative Example 2 was 0.45 nm.

In addition, the glide avalanche characteristics of the magnetic recording mediums of the present Example and Comparative Examples 1 and 2 were evaluated. The evaluation was measured by a DS4100 device manufactured by Sony Tektro Corporation using a 50% slider head manufactured by Glide Lite Corporation. As a result, it was known that the magnetic recording medium of the present example had a low glide avalanche of 4.2 nm and good head levitation characteristics. On the other hand, the glide avalanche of the magnetic recording medium of Comparative Example 1 was 5.1 nm, and the glide avalanche of the magnetic recording medium of Comparative Example 2 was 5.6 nm.

While preferred embodiments and examples of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of manufacturing a magnetic recording medium, comprising the steps of:
    forming a magnetic layer on at least one surface of a nonmagnetic substrate;
    forming a groove in which a nonmagnetic section is formed by etching a portion corresponding to a formation region of the nonmagnetic section in the magnetic layer and a magnetic recording section formed of the magnetic layer;
    applying a resin having an active energy ray curable functional group to the surface of the magnetic recording section so as to fill the groove;
    pressing a plate material against the resin so that the smooth surface of the plate material is in contact with the surface of the resin to make the surface of the resin smooth;
    removing the plate material from the resin after the step of pressing the plate material; and
    forming the nonmagnetic section in the groove by etching and removing a portion located above the surface of the magnetic recording section in the resin having a smooth surface after the step of removing the plate material.

2. The method of manufacturing a magnetic recording medium according to claim 1, wherein in the step of pressing the plate material, the plate material is pressed against the resin in an atmosphere having a lower pressure than atmospheric pressure.

3. The method of manufacturing a magnetic recording medium according to claim 1,
    wherein in the step of pressing the plate material, a light-transmitting plate material having a light-transmitting property as the plate material is pressed against the resin to make the surface of the resin smooth, and
    a step of curing the resin is provided between the step of pressing the plate material and the step of removing the plate material by irradiating the resin with light through the light-transmitting plate material.

4. The method of manufacturing a magnetic recording medium according to claim 1, further comprising the step of forming a protective film on the surface of the magnetic recording section and the surface of the nonmagnetic section, after the step of forming the nonmagnetic section.

5. The method of manufacturing a magnetic recording medium according to claim 1, wherein the resin includes an organosilicon compound.

6. The method of manufacturing a magnetic recording medium according to claim 1, wherein in the step of applying the resin, the resin is applied to the surface of the magnetic recording section by a spin-on coating method.

7. The method of manufacturing a magnetic recording medium according to claim 1, wherein in the step of applying the resin, the resin is applied to the surface of the magnetic recording section by a dipping method.

8. The method of manufacturing a magnetic recording medium according to claim 1, wherein in the step of forming the nonmagnetic section, the resin is etched by an ion beam etching method.

9. The method of manufacturing a magnetic recording medium according to claim 1, wherein the active energy ray curable functional group includes at least one selected from a group consisting of an epoxy group, an acryl group, a methacryl group, and an oxetanyl group.

* * * * *